(12) United States Patent
Hu et al.

(10) Patent No.: US 12,480,634 B2
(45) Date of Patent: Nov. 25, 2025

(54) LIGHT-TRANSMITTING ASSEMBLY AND VEHICLE

(71) Applicant: FUYAO GLASS INDUSTRY GROUP CO., LTD., Fujian (CN)

(72) Inventors: Qingtuan Hu, Fujian (CN); Lixing Jiang, Fujian (CN); Conglong Lin, Fujian (CN)

(73) Assignee: FUYAO GLASS INDUSTRY GROUP CO., LTD., Fujian (CN)

( * ) Notice: Subject to any disclaimer, the term of this patent is extended or adjusted under 35 U.S.C. 154(b) by 0 days.

(21) Appl. No.: 18/584,429

(22) Filed: Feb. 22, 2024

(65) Prior Publication Data

US 2024/0191862 A1    Jun. 13, 2024

Related U.S. Application Data

(63) Continuation of application No. PCT/CN2022/117306, filed on Sep. 6, 2022.

(30) Foreign Application Priority Data

Sep. 7, 2021 (CN) .......................... 202111043046.8

(51) Int. Cl.
*F21S 43/27* (2018.01)
*F21S 43/19* (2018.01)
(Continued)

(52) U.S. Cl.
CPC ............... *F21S 43/27* (2018.01); *F21S 45/50* (2018.01); *F21V 17/04* (2013.01); *F21S 43/195* (2018.01); *F21V 19/04* (2013.01)

(58) Field of Classification Search
CPC .. B60Q 3/217; B60Q 3/50; F21S 43/50; F21S 43/51
See application file for complete search history.

(56) References Cited

U.S. PATENT DOCUMENTS 11,241,998 B2 *  2/2022  Scherer .................... B60Q 3/51
11,331,885 B2 *  5/2022  Hennion ........... B32B 17/10036
(Continued)

FOREIGN PATENT DOCUMENTS

CN    202145365 U    2/2012
CN    209484507 U    10/2019
(Continued)

OTHER PUBLICATIONS

International Search Report dated Nov. 30, 2022 issued in PCT/CN2022/117306.
(Continued)

*Primary Examiner* — Matthew J. Peerce
(74) *Attorney, Agent, or Firm* — Scully, Scott, Murphy & Presser, P.C.

(57) ABSTRACT

A light-transmitting assembly and a vehicle are provided in the disclosure. The light-transmitting assembly includes a light-transmitting substrate and a light source assembly. The light-transmitting substrate defines a mounting through-hole. The light source assembly is connected to the light-transmitting substrate and positioned at the mounting through-hole. The light source assembly includes a box, a lampshade, and a light-emitting element. The lampshade is detachably connected to the box. The lampshade and the box cooperatively define an accommodating space. The light-emitting element is received in the accommodating space. The light-transmitting assembly of the disclosure can be assembled and disassembled quickly and repeatedly, thereby realizing quick replacement of the light-emitting element.

18 Claims, 6 Drawing Sheets

(51) Int. Cl.
*F21S 45/50* (2018.01)
*F21V 17/04* (2006.01)
*F21V 19/04* (2006.01)

(56) References Cited

U.S. PATENT DOCUMENTS

| | | | | |
|---|---|---|---|---|
| 2005/0254250 | A1* | 11/2005 | Nagai | B60Q 3/51 |
| | | | | 362/490 |
| 2010/0014308 | A1 | 1/2010 | Robin et al. | |
| 2015/0258932 | A1 | 9/2015 | Kim et al. | |
| 2017/0349088 | A1* | 12/2017 | Yokoyama | F21V 31/03 |

FOREIGN PATENT DOCUMENTS

| | | | | |
|---|---|---|---|---|
| CN | 110486684 | A | | 11/2019 |
| CN | 212565633 | U | | 2/2021 |
| CN | 212840784 | U | | 3/2021 |
| DE | 19616974 | A1 | * 10/1997 | ........... B60Q 1/0023 |
| DE | 102014117842 | A1 | | 6/2016 |
| JP | S62197446 | U | | 12/1987 |
| JP | 7032258 | Y2 | | 7/1995 |
| JP | 2002343113 | A | | 11/2002 |
| JP | 2005175137 | A | | 6/2005 |
| JP | 2013008509 | A | | 1/2013 |
| JP | 3201526 | U | | 12/2015 |
| JP | 2018073496 | A | | 5/2018 |
| JP | 3226661 | U | | 7/2020 |
| KR | 20100048786 | A | | 5/2010 |
| KR | 20210042542 | A | | 4/2021 |

OTHER PUBLICATIONS

Chinese First Office Action dated Jun. 6, 2022 issued in CN 202111043046.8.
Chinese Second Office Action dated Jan. 20, 2023 issued in CN 202111043046.8.
The extended European search report issued in corresponding European application No. 22866599.8 dated Oct. 8, 2024.
Notice of Reasons for Refusal dated Jan. 10, 2025 received in Japanese Patent Application No. 2024-513126.
Office Action dated Jul. 24, 2025 received in Korean Patent Application No. 10-2024-7006721.

* cited by examiner

LIGHT-TRANSMITTING ASSEMBLY AND VEHICLE

CROSS-REFERENCE TO RELATED APPLICATIONS

This application is a continuation of International Patent Application No. PCT/CN2022/117306, filed Sep. 6, 2022, which claims priority to Chinese Patent Application No. 202111043046.8, filed Sep. 7, 2021, the disclosures of each of which are hereby incorporated by reference in their entireties.

TECHNICAL FIELD

The disclosure relates to the field of automobiles, and in particular, to a light-transmitting assembly and a vehicle.

BACKGROUND

With the development of automobiles, glass decorations of various signal lamps of the automobile have become increasingly diversified. When it becomes necessary to replace the signal lamp, disassembling of the signal lamp is often inconvenient, typically requiring the replacement of the entire glass sheet or posing difficulties in avoiding damage to original glass decorative accessories.

SUMMARY

A light-transmitting assembly is provided in the disclosure. The light-transmitting assembly includes a light-transmitting substrate and a light source assembly. The light-transmitting substrate defines a mounting through-hole. The light source assembly is connected to the light-transmitting substrate and positioned at the mounting through-hole. The light source assembly includes a lampshade, a box, and a light-emitting element. The lampshade is detachably connected to the box, the lampshade and the box cooperatively define an accommodating space, and the light-emitting element is received in the accommodating space.

In some embodiments, the lampshade has a first fitting portion, the box has a second fitting portion, and the first fitting portion and the second fitting portion mate with each other to enable the lampshade to be detachably connected to the box.

In some embodiments, the first fitting portion is a groove and the second fitting portion is a buckle, or the first fitting portion is a buckle and the second fitting portion is a groove. The box is snap-fitted with the lampshade through the groove and the buckle.

In some embodiments, the lampshade is fixedly connected to the light-transmitting substrate. Alternatively, the box is fixedly connected to the light-transmitting substrate.

In some embodiments, the light source assembly further includes a sealing ring arranged between the lampshade and the box to enable the lampshade to be in sealed connection with the box.

In some embodiments, the lampshade includes a lampshade body and a first limiting portion protruding from the lampshade body. The box includes a box body and a second limiting portion protruding from the box body. The light-transmitting substrate is arranged between the first limiting portion and the second limiting portion. The first fitting portion and the second fitting portion cooperate to detachably connect the box, the lampshade, and the light-transmitting substrate together.

In some embodiments, the light source assembly further includes a sealing ring. The lampshade, the box, and the light-transmitting substrate cooperatively define a gap therebetween, and the sealing ring extends into the gap to enable the lampshade, the box, and the light-transmitting substrate to be in sealed connection with one another.

In some embodiments, part of the box body extends into the mounting through-hole, the part of the box body and the light-transmitting substrate cooperatively define a first gap there between, and the sealing ring extends into the first gap and abuts against both the first limiting portion and the second limiting portion.

In some embodiments, the second limiting portion is positioned at one side of the light-transmitting substrate, and the second limiting portion and the light-transmitting substrate cooperatively define a second gap there between. The first limiting portion is positioned at another side of the light-transmitting substrate, part of the box body extends into the mounting through-hole, and the part of the box body and the first limiting portion cooperatively define a third gap there between. The sealing ring further extends into at least one of the second gap or the third gap.

In some embodiments, the mounting through-hole is implemented as one or more mounting through-holes, the light source assembly is implemented as one or more light source assemblies, a number of the one or more mounting through-holes is equal to a number of the one or more light source assemblies, and the one or more light source assemblies are in one-to-one correspondence with the one or more mounting through-holes, and each of the one or more light source assemblies faces a corresponding mounting through-hole.

In some embodiments, the light-transmitting substrate includes at least two light-transmitting sub-substrates. The mounting through-hole is implemented into one or more mounting through-holes, and each of the one or more mounting through-holes is defined between two adjacent light-transmitting sub-substrates.

In some embodiments, the light source assembly further includes a harness joint in communication with the light-emitting element and a vehicle controller. The harness joint is configured to receive a control signal sent by the vehicle controller and transmit the control signal to the light-emitting element to control the light-emitting element to emit light of a preset pattern.

In some embodiments, the lampshade is fixedly connected to the light-transmitting substrate. The lampshade is fixedly connected to the light-transmitting substrate through a fixing member, or the lampshade is formed at the mounting through-hole through injection molding. Alternatively, the box is fixedly connected to the light-transmitting substrate, where the box is fixedly connected to the light-transmitting substrate through a fixing member or the box is formed at the mounting through-hole through injection molding.

A vehicle is further provided in the disclosure. The vehicle includes the light-transmitting assembly provided in any one of the above embodiments and a vehicle body. The light-transmitting assembly is fixed to the vehicle body.

Reference numbers are described as follows:

vehicle: 1; light-transmitting assembly: 10; light-transmitting substrate: 110; light-transmitting sub-substrate: 110a; mounting through-hole: 111; light source assembly: 120; lampshade: 121; box: 122; light-emitting element: 123; accommodating space: 124; first fitting portion: 1211; second fitting portion: 1221; fixing member: 1111; sealing ring: 125; lampshade body: 1212; first limiting portion: 1213; box body: 1222; second limiting portion: 1223; first gap: 1251; second gap: 1252; third gap: 1253; connecting material: 112; harness joint: 126; vehicle body: 20; vehicle controller: 210.

DETAILED DESCRIPTION

Technical solutions in embodiments of the disclosure will be described clearly and completely hereinafter with reference to the accompanying drawings described. Apparently, the described embodiments are merely some rather than all embodiments of the disclosure. All other embodiments obtained by those of ordinary skill in the art based on the embodiments of the disclosure without creative efforts shall fall within the protection scope of the disclosure.

The terms such as "first" and "second" used in the specification, the claims, and the accompany drawings of the disclosure are used for distinguishing between different objects rather than describing a particular order. The terms "include", "comprise", and "have" as well as variations thereof are intended to cover non-exclusive inclusion. For example, a process, system, product, or apparatus including a series of steps or units is not limited to the listed steps or units, it can optionally include other operations or units that are not listed; alternatively, other operations or units inherent to the process, product, or device can be included either.

The term "embodiment" referred to herein means that a particular feature, structure, or feature described in connection with the embodiment may be contained in at least one embodiment of the disclosure. The phrase appearing in various places in the specification does not necessarily refer to the same embodiment, nor does it refer an independent or alternative embodiment that is mutually exclusive with other embodiments. It is expressly and implicitly understood by those skilled in the art that an embodiment described herein may be combined with other embodiments.

Figure 1:
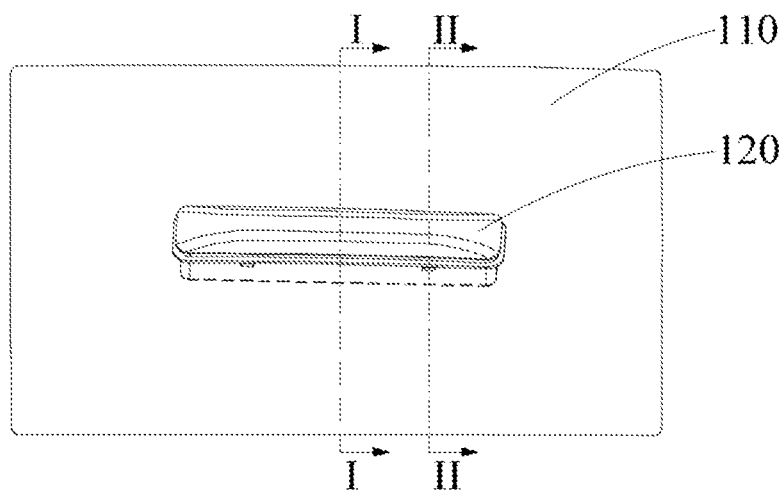
FIG. 1 is a schematic structural view of a light-transmitting assembly according to an embodiment of the disclosure.
Figure 2:
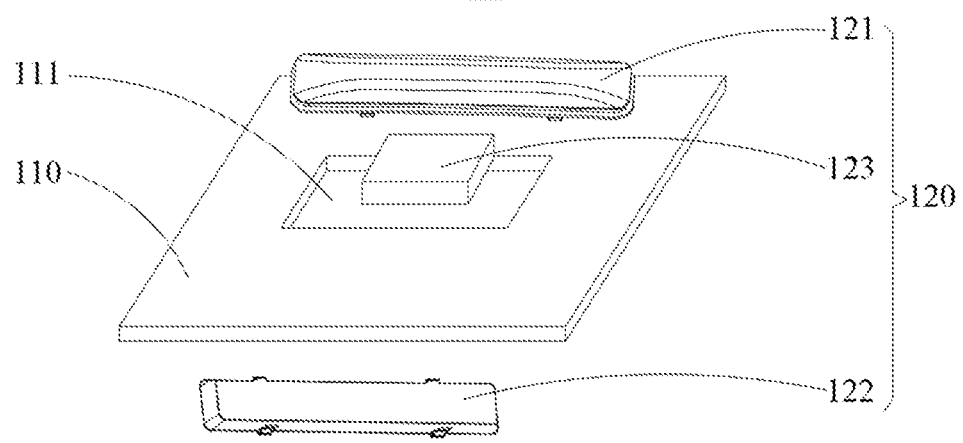
FIG. 2 is an exploded perspective view of the light-transmitting assembly illustrated in FIG. 1.
Figure 3:
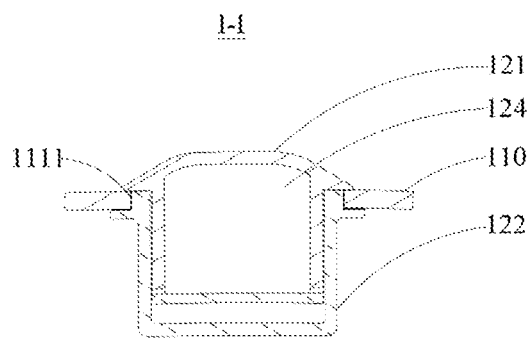
FIG. 3 is a cross-sectional view of a light-transmitting assembly according to an embodiment of the disclosure, taken along line I-I in FIG. 1.

A light-transmitting assembly 10 is provided in the disclosure. FIG. 1 is a schematic structural view of a light-transmitting assembly according to an embodiment of the disclosure. FIG. 2 is an exploded perspective view of the light-transmitting assembly illustrated in FIG. 1. FIG. 3 is a cross-sectional view of a light-transmitting assembly according to an embodiment of the disclosure, taken along line I-I in FIG. 1. The light-transmitting assembly 10 includes a light-transmitting substrate 110 and a light source assembly 120. The light-transmitting substrate 110 defines a mounting through-hole 111. The light source assembly 120 is connected to the light-transmitting substrate 110 and positioned at the mounting through-hole 111. The light source assembly 120 includes a lampshade 121, a box 122, and a light-emitting element 123. The lampshade 121 is detachably connected to the box 122. The lampshade 121 and the box 122 cooperatively define an accommodating space 124. The light-emitting element 123 is received in the accommodating space 124.

The light-transmitting substrate 110 may be a plate which allows light to pass through. For example, the light-transmitting substrate 110 may be made of glass, plastic, or resin.

The mounting through-hole 111 may be defined at the center of the light-transmitting substrate 110, or may be defined at an edge of the light-transmitting substrate 110, which is not limited herein. The mounting through-hole 111 may be circular, rectangular, elliptical, etc., as long as the mounting through-hole 111 can mate with the light source assembly 120 to allow mounting of the light source assembly 120.

The light source assembly 120 is connected to the light-transmitting substrate 110 at the mounting through-hole 111. In one embodiment, some components of the light source assembly 120 are fixedly connected to the light-transmitting substrate 110, and other components of the light source assembly 120 are detachably connected to the light-transmitting substrate 110. In another embodiment, all components of the light source assembly 120 are detachably connected to the light-transmitting substrate 110. A connection between the light source assembly 120 and the light-transmitting substrate 110 will be described in detail hereinafter.

The lampshade 121 is generally arranged to face a light-exiting surface of the light-emitting element 123 and allows light emitted by the light-emitting element 123 to pass through. Therefore, the lampshade 121 also allows light to pass through.

A detachably connection between the lampshade 121 and the box 122 is described in detail hereinafter.

The light-emitting element 123 may be, but is not limited to, a halogen lamp, a xenon lamp, a light-emitting diode (LED), or a laser lamp.

The lampshade 121 and the box 122 cooperatively define the accommodating space 124. The accommodating space 124 may accommodate the light-emitting element 123. This arrangement can protect the light-emitting element 123, thereby preventing direct exposure of the light-emitting element 123, which may lead to damage to the light-emitting element 123. In one embodiment, the accommodating space 124 defined by the lampshade 121 and the box 122 is sealed, thereby preventing entry of external factors such as moisture and dust, which may adversely affect the light-emitting element 123, into the accommodating space 124. In other embodiments, the accommodating space 124 defined by the lampshade 121 and the box 122 is non-sealed, as long as the accommodating space 124 can fulfill the requirements of accommodating the light-emitting element 123.

The light-emitting element 123 is disposed in the accommodating space 124 through various manners, including but not limited to the following. In one embodiment, the light-emitting element 123 is fixed to the lampshade 121. For example, the light-emitting element 123 is disposed on a bottom wall of the lampshade 121. In another embodiment, the light-emitting element 123 is fixed to the box 122. For example, the light-emitting element 123 is disposed on a bottom wall of the box 122. As long as the arrangement that the light-emitting element 123 is disposed in the accommodating space 124 can be satisfied, the above manners are not limited thereto.

In the light-transmitting assembly 10 provided in the embodiments of the disclosure, the lampshade 121 is in detachable connection with the box 122. This design enables a quick removal and replacement of the light-emitting element 123 disposed in the accommodating space 124 by simply disassembling the light source assembly 120, and a new light-emitting element can be quickly mounted to replace. The entire assembly and disassembly is quick and convenient, eliminating the need to disassemble or replace the entire light-transmitting assembly 10. As a result, damage to the light-transmitting substrate 110 and corresponding decorative accessories can be effectively avoided.

Figure 4:
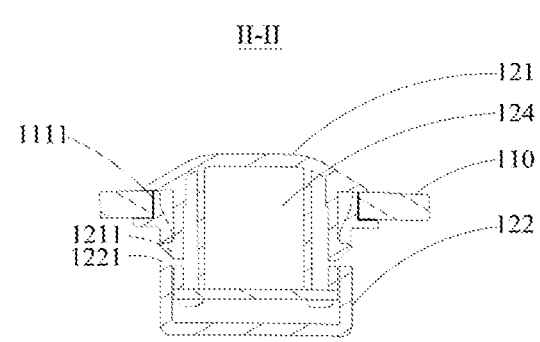
FIG. 4 is a cross-sectional view of the light-transmitting assembly in FIG. 3, taken along line II-II in FIG. 1.
Figure 5:
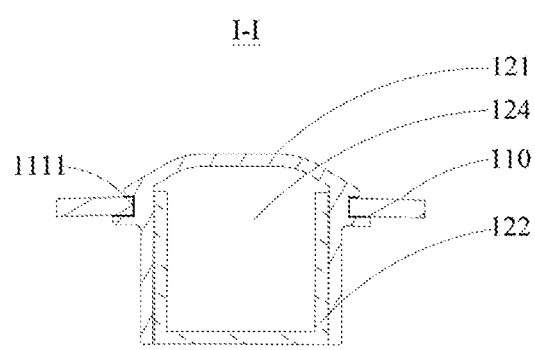
FIG. 5 is a cross-sectional view of a light-transmitting assembly according to another embodiment of the disclosure, taken along line I-I in FIG. 1.
Figure 6:
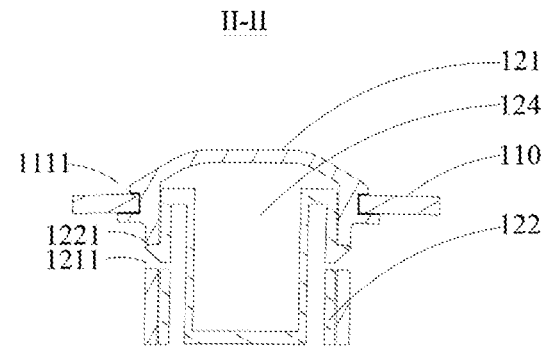
FIG. 6 is a cross-sectional view of the light-transmitting assembly in FIG. 5, taken along line II-II in FIG. 1.

The detachable connection between the lampshade 121 and the box 122 is described below. FIG. 3 is a cross-sectional view of a light-transmitting assembly according to an embodiment of the disclosure, taken along line I-I in FIG. 1. FIG. 4 is a cross-sectional view of the light-transmitting assembly in FIG. 3, taken along line II-II in FIG. 1. FIG. 5 is a cross-sectional view of a light-transmitting assembly according to another embodiment of the disclosure, taken along line I-I in FIG. 1. FIG. 6 is a cross-sectional view of the light-transmitting assembly in FIG. 5, taken along line II-II in FIG. 1. In the embodiments, the lampshade 121 has a first fitting portion 1211. The box 122 has a second fitting portion 1221. The first fitting portion 1211 and the second fitting portion 1221 mate with each other to enable the lampshade 121 to be detachably connected to the box 122.

In the embodiments illustrated in FIGS. 5 and 6, the first fitting portion 1211 is a groove, and the second fitting portion 1221 is a buckle. In the embodiments illustrated in FIGS. 3 and 4, the first fitting portion 1211 is a buckle, and the second fitting portion 1221 is a groove. That is, the box 122 is snap-fitted with the lampshade 121 through the groove and the buckle.

In the embodiment, the first fitting portion 1211 is symmetrically arranged on two opposite side walls of the lampshade 121, and the second fitting portion 1221 is symmetrically arranged on two opposite side walls of the box 122. In a case where the first fitting portion 1211 is symmetrically disposed on two opposite side walls of the lampshade 121 and the second fitting portion 1221 is symmetrically disposed on two opposite side walls of the box 122, it is convenient for detachment between the lampshade 121 and the box 122. It can be understood that, in other embodiments, the first fitting portion 1211 may be asymmetrically disposed on two opposite side walls of the lampshade 121, and the second fitting portion 1221 may be asymmetrically disposed on two opposite side walls of the box 122, as long as the first fitting portion 1221 and the second fitting portion 1221 can mate with each other to enable the lampshade 121 to be detachably connected to the box 122.

The disassembly and assembly of the light source assembly 120 will be described below with reference to the embodiments.

As illustrated in FIGS. 5 and 6, the first fitting portion 1211 is a groove defined on a side wall of the lampshade 121 and extending through two opposite surfaces of the side wall of the lampshade 121. That is, the groove is a through-hole. The second fitting portion 1221 is a buckle, and is disposed on a side wall of the box 122. During mounting of the light source assembly 120, the light-emitting element 123 is first placed inside either the box 122 or the lampshade 121. For example, the light-emitting element 123 may be first fixed on the bottom wall or the side wall of the lampshade 121. Consequently, the first fitting portion 1211 of the lampshade 121 may be placed into the box 122, and a portion of the lampshade 121 away from the first fitting portion 1211 is pressed until the first fitting portion 1211 extends into the second fitting portion 1221. As a result, a snap-fitting connection between the lampshade 121 and the box 122 is achieved. During detachment of the lampshade 121 from the box 122, a force may be exerted to press the buckle inward until the buckle pops out of the groove, allowing the removal of the lampshade 121 and the replacement of the light-emitting element 123. In another embodiment, the second fitting portion 1221 of the box 122 may be first placed into the lampshade 121, and then an external surface of the lampshade 121 away from the first fitting portion 1211 is pressed until the second fitting portion 1221 extends into the first fitting portion 1211. As a result, a snap-fitting connection between the lampshade 121 and the box 122 is achieved. During detachment of the lampshade 121 from the box 122, a force may be exerted to press the buckle inward until the buckle pops out of the groove, allowing the removal of the box 122 and the replacement of the light-emitting element 123.

In other embodiments, a mating connection between the first fitting portion 1211 and the second fitting portion 1221 may also be a sliding groove connection or a threaded connection, as long as a detachable connection between the lampshade 121 and the box 122 can be achieved.

In other embodiments, the first fitting portion 1211 may be disposed on the bottom wall of the lampshade 121, and the second fitting portion 1221 may be disposed on the bottom wall of the box 122.

In the embodiment, the lampshade 121 has the first fitting portion 1211, and the box 122 has the second fitting portion 1221, the first fitting portion 1211 and the second fitting portion 1221 cooperate to enable a detachable connection between the lampshade 121 and the box 122. This configuration allows a convenient disassembly and assembly of the lampshade 121 and the box 122, thereby facilitating the easy replacement of the light-emitting element 123 accommodated in the accommodating space 124.

In addition, the first fitting portion 1211 may be a groove, and the second fitting portion 1221 may be a buckle. Alternatively, the first fitting portion 1211 may be a buckle, and the second fitting portion 1221 may be a groove, and the box 122 is snap-fitted with the lampshade 121 through the buckle and the groove, so that the detachable connection between the box 122 and the lampshade 121 is simple and convenient to operate.

The following describes the connection between the light source assembly 120 and the light-transmitting substrate 110.

As illustrated in FIGS. 3-6, in the embodiment, the lampshade 121 is fixedly connected to the light-transmitting substrate 110, or the box 122 is fixedly connected to the light-transmitting substrate 110.

As illustrated in FIGS. 3 and 4, in the embodiment, the box 122 is fixedly connected to the light-transmitting substrate 110 through a fixing member 1111. During connection of the light source assembly 120 to the light-transmitting substrate 110, in one embodiment, the box 122 is first fixedly connected to the light-transmitting substrate 110 through the fixing member 1111, and then the lampshade 121 is detachably connected to the box 122 through the cooperation of the first fitting portion 1211 and the second fitting portion 1221. In another embodiment, a size of the lampshade 121 is less than a size of the mounting through-hole 111, the box 122, the light-emitting element 123, and the lampshade 121 may be first assembled together to form the light source assembly 120, and then the light source assembly 120 can be fixedly connected to the light-transmitting substrate 110 through the fixing member 1111. It can be understood that, a process of connecting the light source assembly 120 to the light-transmitting substrate 110 is not limited herein, as long as the fixed connection between the light source assembly 120 and the light-transmitting substrate 110 can be achieved. The afore-identified embodiments illustrating connection between the light source assembly 120 and the light-transmitting substrate 110 should not be construed as limiting the connection manner of the light source assembly 120 and the light-transmitting substrate 110 in the disclosure.

As illustrated in FIGS. 5 and 6, in the embodiment, the lampshade 121 is fixedly connected to the light-transmitting substrate 110 through the fixing member 1111. During connection of the light source assembly 120 to the light-transmitting substrate 110, in one embodiment, the lampshade 121 is first fixedly connected to the light-transmitting substrate 110, and then the box 122 is detachably connected to the lampshade 121 through cooperation between the first fitting portion 1211 and the second fitting portion 1221. In another embodiment, the box 122, the light-emitting element 123, and the lampshade 121 may be first assembled together to form the light source assembly 120, and then the light source assembly 120 is fixedly connected to the light-transmitting substrate 110 through the fixing member 1111. It can be understood that, the process of connecting the light source assembly 120 to the light-transmitting substrate 110 is not limited herein, as long as the fixed connection between the light source assembly 120 and the light-transmitting substrate 110 can be achieved. The afore-identified embodiments illustrating connection between the light source assembly 120 and the light-transmitting substrate 110 should not be construed as limiting the connection manner of the light source assembly 120 and the light-transmitting substrate 110 in the disclosure.

In the embodiment, a fixed connection between the lampshade 121 and the light-transmitting substrate 110 or a fixed connection between the box 122 and the light-transmitting substrate 110 may be achieved through manners including but not limited to, the utilization of the fixing member 1111, injection molding with a high-light material, bonding with high-strength adhesive, or thermal melting.

Figure 7:
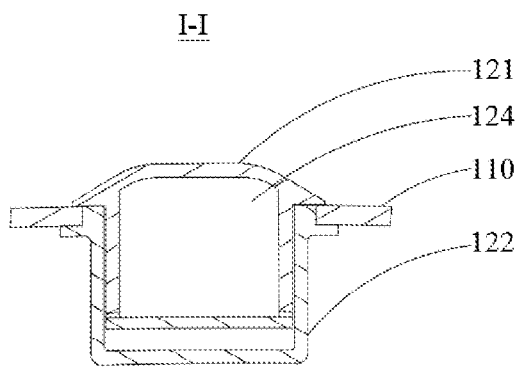
FIG. 7 is a cross-sectional view of a light-transmitting assembly according to another embodiment of the disclosure, taken along line I-I in FIG. 1.
Figure 8:
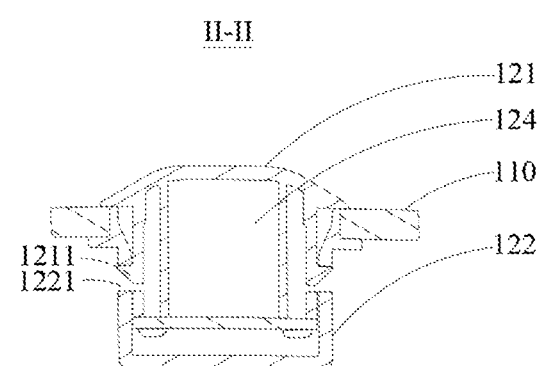
FIG. 8 is a cross-sectional view of the light-transmitting assembly in FIG. 7, taken along line II-II in FIG. 1.
Figure 9:
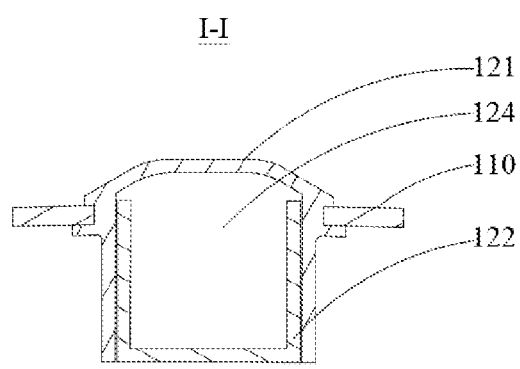
FIG. 9 is a cross-sectional view of a light-transmitting assembly according to another embodiment of the disclosure, taken along line I-I in FIG. 1.
Figure 10:
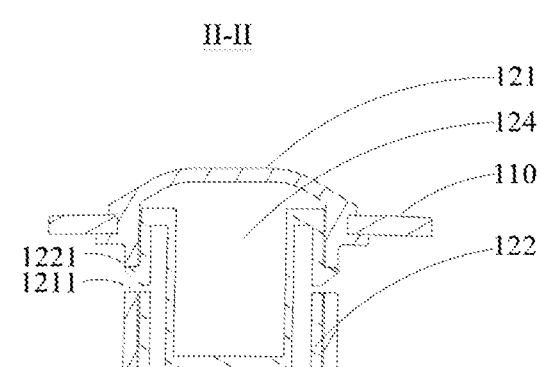
FIG. 10 is a cross-sectional view of the light-transmitting assembly in FIG. 9, taken along line II-II in FIG. 1.

In other embodiments, the box 122 or the lampshade 121 may be directly formed in the mounting through-hole 111 through injection molding. FIG. 7 is a cross-sectional view of a light-transmitting assembly according to another embodiment of the disclosure, taken along line I-I in FIG. 1. FIG. 8 is a cross-sectional view of the light-transmitting assembly in FIG. 7, taken along line II-II in FIG. 1. In the embodiment illustrated in FIG. 7 and FIG. 8, the box 122 is directly formed in the mounting through-hole 111 through injection molding. In a case where the box 122 is directly formed in the mounting through-hole 111 through injection molding, it can also be regarded that the box 122 is fixedly connected to the light-transmitting substrate 110. In other words, the box 122 and the light-transmitting substrate 110 are formed through injection molding without the fixing member 1111. FIG. 9 is a cross-sectional view of a light-transmitting assembly according to another embodiment of the disclosure, taken along line I-I in FIG. 1. FIG. 10 is a cross-sectional view of the light-transmitting assembly in FIG. 9, taken along line II-II in FIG. 1. In the embodiment illustrated in FIG. 9 and FIG. 10, the lampshade 121 is directly formed in the mounting through-hole 111 through injection molding. In a case where the lampshade 121 is directly formed in the mounting through-hole 111 through injection molding, it can also be regarded that the lampshade 121 is fixedly connected to the light-transmitting substrate 110. In other words, the lampshade 121 and the light-transmitting substrate 110 are formed through injection molding without the fixing member 1111. The disclosure does not limit whether the fixing member 1111 is included in a case where the lampshade 121 is fixedly connected to the light-transmitting substrate 110, as long as the fixed connection between the lampshade 121 and the light-transmitting substrate 110 can be achieved. Furthermore, the disclosure does not limit whether the fixing member 1111 is included in a case where the box 122 is fixedly connected to the light-transmitting substrate 110, as long as the fixed connection between the box 122 and the light-transmitting substrate 110 can be achieved.

In the embodiment, in a case where the lampshade 121 is fixedly connected to the light-transmitting substrate 110, a further secure connection can be achieved between the light source assembly 120 and the light-transmitting substrate 110. In addition, during replacement of the light-emitting element 123, only the detachment of the box 122 is required, so that the disassembly and assembly of the light source assembly 120 can be accelerated, thereby facilitating a quicker replacement of the light-emitting element 123.

Similarly, in a case where the box 122 is fixedly connected to the light-transmitting substrate 110, a further secure connection can be achieved between the light source assembly 120 and the light-transmitting substrate 110. In addition, during replacement of the light-emitting element 123, only the detachment of the lampshade 121 is required, so that the disassembly and assembly of the light source assembly 120 can be accelerated, thereby facilitating a quicker replacement of the light-emitting element 123.

Based on the described embodiments, in one embodiment, the light source assembly 120 further includes a sealing ring 125. In a case where the light source assembly 120 includes the sealing ring 125, the connection between the light source assembly 120 and the light-transmitting substrate 110 will be described in detail in the following embodiments.

Figure 11:
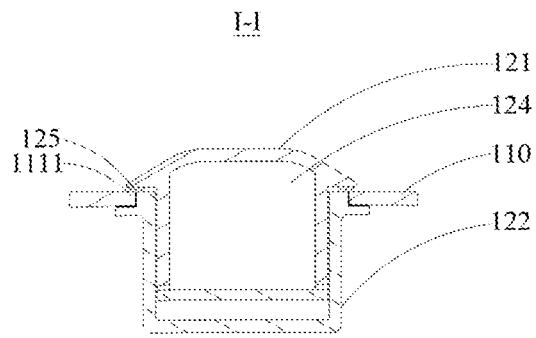
FIG. 11 is a cross-sectional view of a light-transmitting assembly according to another embodiment of the disclosure, taken along line I-I in FIG. 1.
Figure 12:
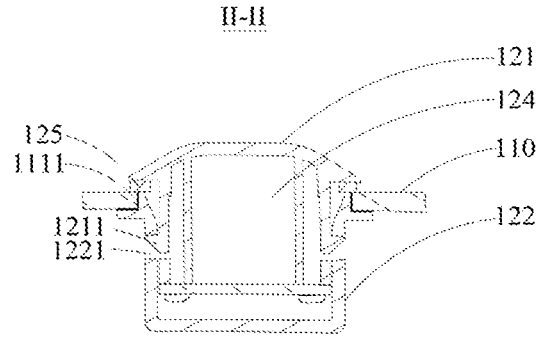
FIG. 12 is a cross-sectional view of the light-transmitting assembly in FIG. 11, taken along line II-II in FIG. 1.

FIG. 11 is a cross-sectional view of a light-transmitting assembly according to another embodiment of the disclosure, taken along line I-I in FIG. 1. FIG. 12 is a cross-sectional view of the light-transmitting assembly in FIG. 11, taken along line II-II in FIG. 1. In the embodiment, the sealing ring 125 is sleeved on the lampshade 121 and is disposed between a contact surface of the lampshade 121 at the mounting through-hole 111 and a contact surface of the box 122 at the mounting through-hole 111.

An assembly of the light source assembly 120 including the sealing ring 125 will be described in detail as follows. In one embodiment, during a fixed connection of the box 122 to the light-transmitting substrate 110 through the fixing member 1111, the sealing ring 125 is first sleeved on the lampshade 121, and then the lampshade 121 is connected to the box 122, so that the sealing ring 125 can be positioned between the lampshade 121 and the box 122. In other embodiments, the box 122, the light-emitting element 123, the sealing ring 125, and the lampshade 121 can be first assembled together to form the light source assembly 120, and then the light source assembly 120 is fixedly connected to the light-transmitting substrate 110 through the fixing member 1111. It can be understood that, the process of connecting the light source assembly 120 to the light-transmitting substrate 110 is not limited herein, as long as the fixed connection between the light source assembly 120 and the light-transmitting substrate 110 can be achieved. The afore-identified embodiments illustrating connection between the light source assembly 120 and the light-transmitting substrate 110 should not be construed as limiting the connection manner of the light source assembly 120 and the light-transmitting substrate 110 in the disclosure.

Figure 13:
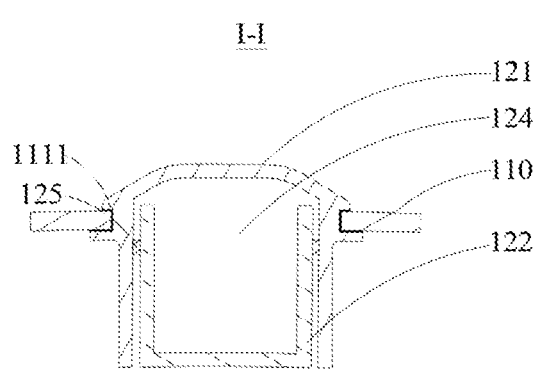
FIG. 13 is a cross-sectional view of a light-transmitting assembly according to another embodiment of the disclosure, taken along line I-I in FIG. 1.
Figure 14:
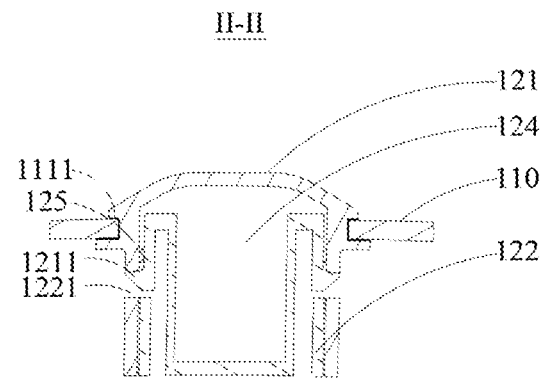
FIG. 14 is a cross-sectional view of the light-transmitting assembly in FIG. 13, taken along line II-II in FIG. 1.

FIG. 13 is a cross-sectional view of a light-transmitting assembly according to another embodiment of the disclosure, taken along line I-I in FIG. 1. FIG. 14 is a cross-sectional view of the light-transmitting assembly in FIG. 13, taken along line II-II in FIG. 1. The sealing ring 125 is sleeved on the box 122, and is disposed at one side of the second fitting portion 1221 close to the mounting through-hole 111.

An assembly of the light source assembly 120 including the sealing ring 125 will be described below in detail as follows. In one embodiment, during a fixed connection of the lampshade 121 to the light-transmitting substrate 110 through the fixing member 1111, the sealing ring 125 is first sleeved on the box 122 and disposed on one side of the second fitting portion 1221 close to the mounting through-hole 111, and then the box 122 is connected to the lampshade 121, so that the sealing ring 125 is positioned between the lampshade 121 and the box 122. In other embodiments, the box 122, the light-emitting element 123, the sealing ring 125, and the lampshade 121 can be first assembled together to form the light source assembly 120, and then the light source assembly 120 is fixedly connected to the light-transmitting substrate 110 through the fixing member 1111. It can be understood that, the process of connecting the light source assembly 120 to the light-transmitting substrate 110 is not limited herein, as long as the fixed connection between the light source assembly 120 and the light-transmitting substrate 110 can be achieved. The afore-identified embodiments illustrating connection between the light source assembly 120 and the light-transmitting substrate 110 should not be construed as limiting the connection manner of the light source assembly 120 and the light-transmitting substrate 110 in the disclosure.

In the embodiment, the sealing ring 125 enhances the sealing effectiveness of the light source assembly 120, and can more effectively prevent external moisture, dust, and debris from entering the accommodating space 124, thereby preventing the light-emitting element 123 from being damaged by moisture, dust, and debris, and preventing the light-emitting element 123 from failing. Meanwhile, the sealing ring 125 enhances tolerance in the engagement of the first fitting portion 1211 and the second fitting portion 1221, ensuring a further secure connection between the first fitting portion 1211 and the second fitting portion 1221.

Figure 15:
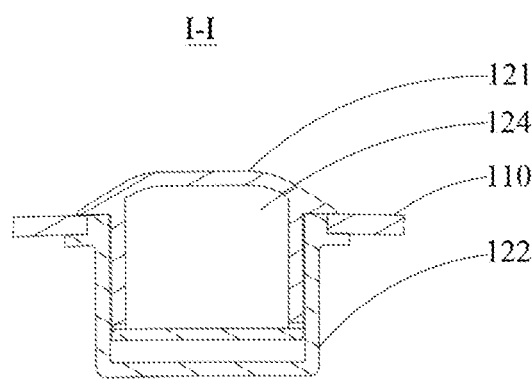
FIG. 15 is a cross-sectional view of a light-transmitting assembly according to another embodiment of the disclosure, taken along line I-I in FIG. 1.
Figure 16:
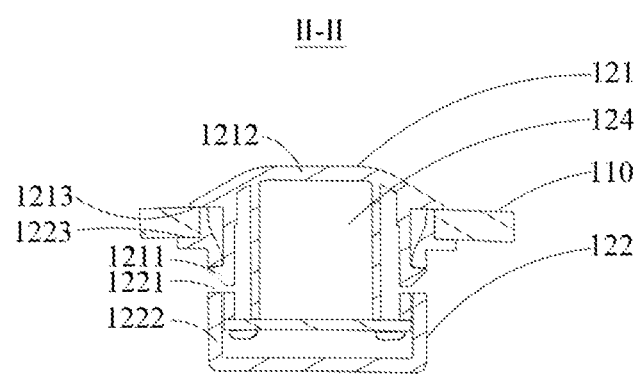
FIG. 16 is a cross-sectional view of the light-transmitting assembly in FIG. 15, taken along line II-II in FIG. 1.

FIG. 15 is a cross-sectional view of a light-transmitting assembly according to another embodiment of the disclosure, taken along line I-I in FIG. 1. FIG. 16 is a cross-sectional view of the light-transmitting assembly in FIG. 15, taken along line II-II in FIG. 1. A non-fixed connection between the lampshade 121 and the light-transmitting substrate 110 or a non-fixed connection between the box 122 and the light-transmitting substrate 110 will be described as follows, where the light source assembly 120 can be directly assembled. In the embodiment, the lampshade 121 includes a lampshade body 1212 and a first limiting portion 1213 protruding from the lampshade body 1212. The box 122 includes a box body 1222 and a second limiting portion 1223 protruding from the box body 1222. The light-transmitting substrate 110 is arranged between the first limiting portion 1213 and the second limiting portion 1223. The first fitting portion 1211 and the second fitting portion 1221 cooperate to detachably connect the box 122, the lampshade 121, and the light-transmitting substrate 110 together.

In the embodiment, the light source assembly 120 is detachably connected to the light-transmitting substrate 110, thereby enhancing the convenience of maintenance of the light-transmitting assembly 10. For example, if there is a need to replace either the lampshade 121 or the box 122, it is not necessary to replace the light-transmitting substrate 110, and only the disassembly of the light source assembly 120 is required.

Figure 17:
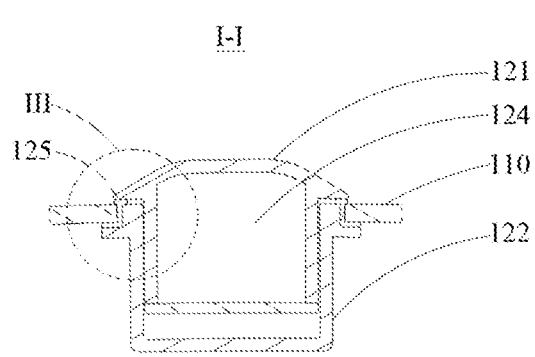
FIG. 17 is a cross-sectional view of a light-transmitting assembly according to another embodiment of the disclosure, taken along line I-I in FIG. 1.
Figure 18:
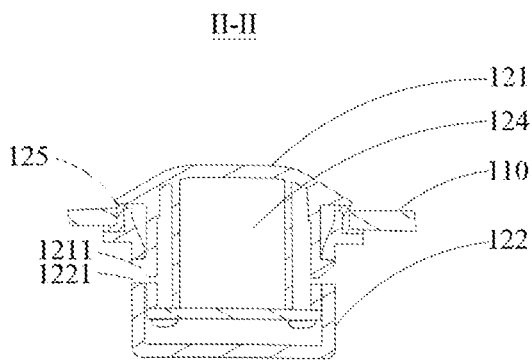
FIG. 18 is a cross-sectional view of the light-transmitting assembly in FIG. 17, taken along line II-II in FIG. 1.

FIG. 17 is a cross-sectional view of a light-transmitting assembly according to another embodiment of the disclosure, taken along line I-I in FIG. 1. FIG. 18 is a cross-sectional view of the light-transmitting assembly in FIG. 17, taken along line II-II in FIG. 1. In the embodiment, the light source assembly 120 further includes a sealing ring 125. The lampshade 121, the box 122, and the light-transmitting substrate 110 cooperatively define a gap therebetween, and the sealing ring 125 extends into the gap to enable the lampshade 121, the box 122, and the light-transmitting substrate 110 to be in sealed connection with one another.

In the embodiment, the sealing ring 125 enhances the sealing effectiveness of the light source assembly 120, and can more effectively prevent external moisture, debris, and air, thereby preventing the light-emitting element 123 from being damaged. Meanwhile, the sealing ring 125 enhances tolerance in the engagement of the first fitting portion 1211 and the fitting portion 1221, ensuring a more secure connection between the first fitting portion 1211 and the fitting portion 1221. Additionally, this arrangement supports a wider range of thicknesses for the light-transmitting substrate 110.

Figure 19:
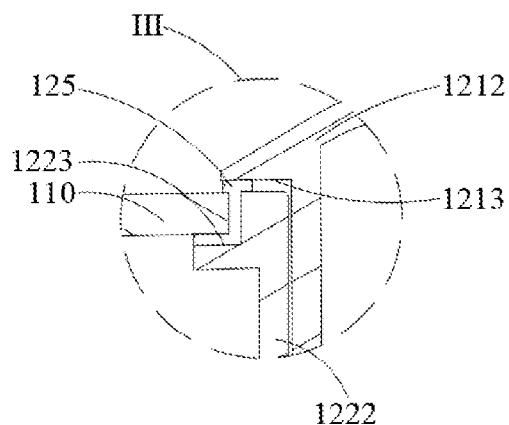
FIG. 19 is a partial enlarged view of the light-transmitting assembly at circle III in FIG. 17.
Figure 20:
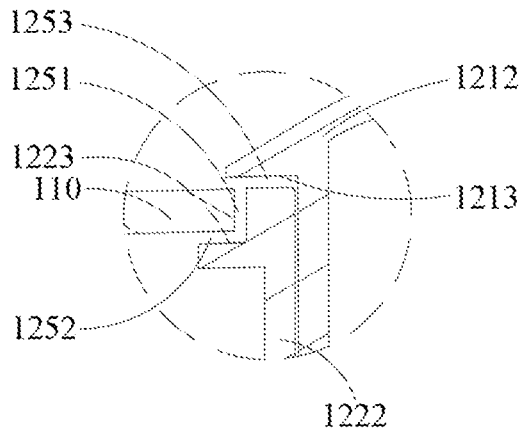
FIG. 20 is a schematic view of FIG. 19 with a sealing ring omitted.

FIG. 19 is a partial enlarged view of the light-transmitting assembly at circle III in FIG. 17. FIG. 20 is a schematic view of FIG. 19 with a sealing ring omitted. In the embodiment illustrated in FIG. 2, FIG. 19, and FIG. 20, part of the box body 1222 extends into the mounting through-hole 111, the part of the box body 1222 and the light-transmitting substrate 110 cooperatively define a first gap 1251 therebetween. The sealing ring 125 extends into the first gap 1251 and abuts against both the first limiting portion 1213 and the second limiting portion 1223.

In the embodiment, the sealing ring 125 abuts against the first limiting portion 1213 and the second limiting portion 1223 and has a "Z" shape, thereby enhancing the sealing effectiveness of the light source assembly 120 and the stability of mounting of the light-transmitting assembly 10.

As illustrated in FIG. 20, in one embodiment, the second limiting portion 1223 is positioned at one side of the light-transmitting substrate 110, and the second limiting portion 1223 and the light-transmitting substrate 110 cooperatively define a second gap 1252 therebetween. The first limiting portion 1213 is positioned at another side of the light-transmitting substrate 110, part of the box body 1222 extends into the mounting through-hole 111, and the part of the box body 1222 and the first limiting portion 1213 cooperatively define a third gap 1253 therebetween. The sealing ring 125 further extends into at least one of the second gap 1252 or the third gap 1253.

In the embodiment, in a case where the sealing ring 125 extends into the second gap 1252, a wider range of thicknesses for the light-transmitting substrate 110 can be allowed, thereby enhancing the sealing effectiveness of the light source assembly 120. In a case where the sealing ring 125 extends into the third gap 1253, the sealing effectiveness of the light source assembly 120 can be enhanced.

Figure 21:
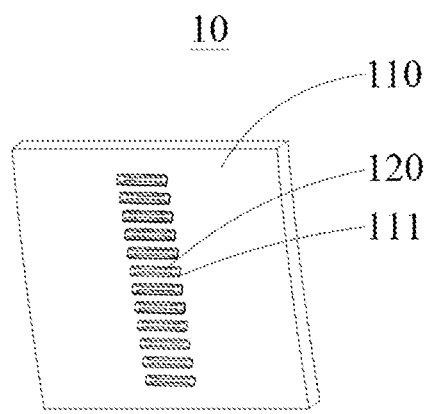
FIG. 21 is a schematic structural view of a light-transmitting assembly according to another embodiment of the disclosure.

FIG. 21 is a schematic structural view of a light-transmitting assembly according to another embodiment of the disclosure. Based on the above embodiments, embodiments in which the light-transmitting substrate 110 defines multiple mounting through-holes 111 will be described as follows. In the embodiments, the light-transmitting substrate 110 defines one or more mounting through-holes 111, the light-transmitting substrate 10 has one or more light source assemblies 120, and a number of the one or more mounting through-holes 111 is equal to a number of the one or more light source assemblies. The one or more light source assemblies 120 are in one-to-one correspondence with the one or more mounting through-holes 111, and each of the one or more light source assemblies 120 faces a corresponding mounting through-hole 111.

In the embodiment, the mounting through-holes 111 may be arranged along a straight line, a circular arc, a rectangle, a character of a preset shape, or a letter of a preset shape. The mounting through-holes 111 may be arranged in any desired configuration, as long as mounting of the light source assembly 120 is not affected. The light source assembly 120 and the light-transmitting substrate 110 can be mounted by a manner illustrated in any one of FIGS. 4, 6, 12, 14, and 16. The embodiment enhances the design flexibility and aesthetics of the light-transmitting assembly 10.

Figure 22:
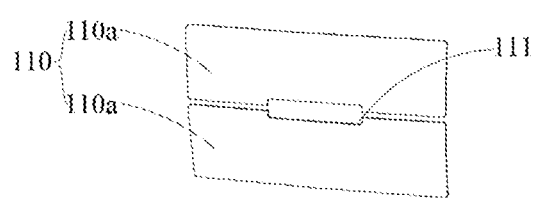
FIG. 22 is a schematic view of a light-transmitting substrate according to another embodiment of the disclosure.

FIG. 22 is a schematic view of a light-transmitting substrate according to another embodiment of the disclosure. Based on the above embodiments, a combination of multiple light-transmitting sub-substrates 110a and the light source assembly 120 will be described as follows. In the embodiment, the light-transmitting substrate 110 includes at least two light-transmitting sub-substrates 110a, and each of the mounting through-holes 111 is defined between two adjacent light-transmitting sub-substrates 110a.

Figure 23:
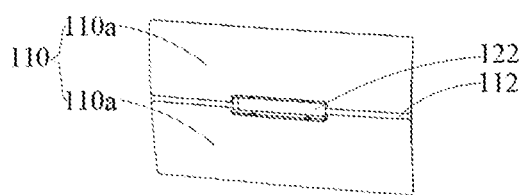
FIG. 23 is a schematic view illustrating a connection between a light-transmitting substrate and a box according to another embodiment of the disclosure.
Figure 24:
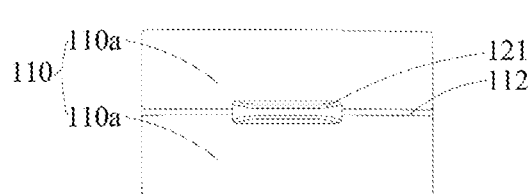
FIG. 24 is a schematic view illustrating a connection between a light-transmitting substrate and a lampshade according to another embodiment of the disclosure.
Figure 25:
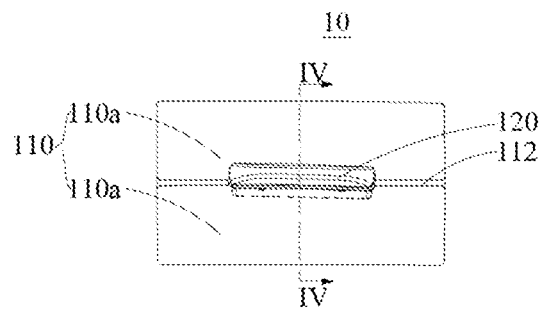
FIG. 25 is a schematic structural view of a light-transmitting assembly according to another embodiment of the disclosure.
Figure 26:
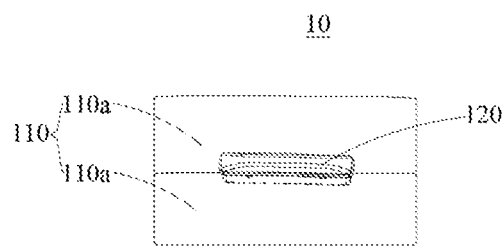
FIG. 26 is a schematic structural view of a light-transmitting assembly according to another embodiment of the disclosure.

In the embodiment, the light-transmitting substrate 110 includes two or more light transmitting sub-substrates 110a. A connection between each two light transmitting sub-substrates 110a and the light source assembly 120 can be achieved in three ways, which are described below with reference to FIGS. 23-26. FIG. 23 is a schematic view illustrating a connection between a light-transmitting substrate and a box according to another embodiment of the disclosure. FIG. 24 is a schematic view illustrating a connection between a light-transmitting substrate and a lampshade according to another embodiment of the disclosure. FIG. 25 is a schematic structural view of a light-transmitting assembly according to another embodiment of the disclosure. FIG. 26 is a schematic structural view of a light-transmitting assembly according to another embodiment of the disclosure.

As illustrated in FIG. 23, in one embodiment, the box 122 is fixedly connected to two adjacent light-transmitting sub-substrates 110a through a connecting material 112 to form a whole. The lampshade 121 and the box 122 are cooperatively connected through the first fitting portion 1211 and the second fitting portion 1221 to form an integrated member as illustrated in FIG. 25.

As illustrated in FIG. 24, in another embodiment, the lampshade 121 is fixedly connected to two adjacent light-transmitting sub-substrates 110a through the connecting material 112 to form a whole. The box 122 and the lampshade 121 are cooperatively connected through the first fitting portion 1211 and the second fitting portion 1221 to form an integrated member as illustrated in FIG. 25.

In another embodiment, the lampshade 121 and the box 122 are fitted and connected to the two light-transmitting sub-substrates 110a at the mounting through-holes 111 through the first fitting portion 1211 and the second fitting portion 1221, to form an integral member as illustrated in FIG. 26.

Figure 27:
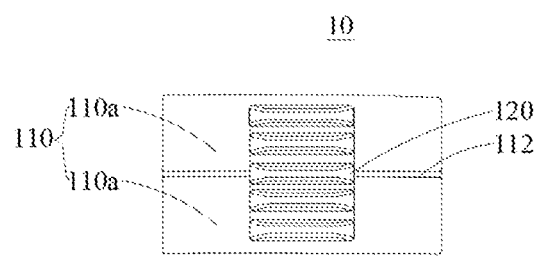
FIG. 27 is a schematic structural view of a light-transmitting assembly according to another embodiment of the disclosure.
Figure 28:
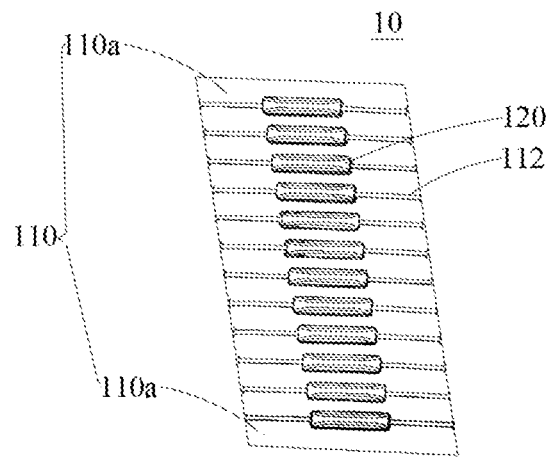
FIG. 28 is a schematic structural view of a light-transmitting assembly according to another embodiment of the disclosure.

Refer to FIGS. 25-28, FIG. 27 is a schematic structural view of a light-transmitting assembly according to another embodiment of the disclosure, and FIG. 28 is a schematic structural view of a light-transmitting assembly according to another embodiment of the disclosure. In the embodiment, a combination of the light-transmitting substrate 110 and the light source assembly 120 can be achieved in various ways. In an embodiment, as illustrated in FIGS. 25 and 26, two light-transmitting sub-substrates 110a cooperate with one light source assembly 120. In another embodiment, as illustrated in FIG. 27, two light-transmitting sub-substrates 110a cooperate with multiple light source assemblies 120. In another embodiment, as illustrated in FIG. 26, multiple light-transmitting sub-substrates 110a cooperate with multiple light source assemblies 120.

In other embodiments, on the basis of FIGS. 25-28, one or more mounting through-holes 111 may be defined on the light-transmitting sub-substrate 110a, thereby increasing diversity of the light-transmitting assembly 10.

Figure 29:
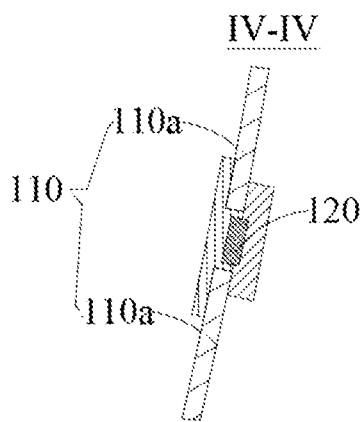
FIG. 29 is a cross-sectional view of the light-transmitting assembly in FIG. 25 according to an embodiment of the disclosure, taken along line IV-IV.

Refer to FIGS. 25 and 29, FIG. 29 is a cross-sectional view of the light-transmitting assembly in FIG. 25 according to an embodiment of the disclosure, taken along line IV-IV. A surface of the connecting material 112 is flush with a surface of the light-transmitting substrate 110, thereby enhancing the aesthetic of the light-transmitting assembly 10.

In the embodiment, the connecting material 112 is a high-light material. The connecting material 112 is fixedly connected through injection molding. For example, a difference between a transmittance of the high-light material and a transmittance of the light-transmitting substrate 110 is within a predetermined range. The predetermined range may be but is not limited to ±5%. Alternatively, the transmittance of the high-light material is greater than or equal to a predetermined transmittance. For example, the transmittance of the high-light material may be but is not limited to 80%.

In the embodiment, multiple flexible manners of matching the light-transmitting substrate 110 and the light source assembly 120 are provided, thereby enhancing the aesthetic and the designability of the light-transmitting substrate 10.

Figure 30:
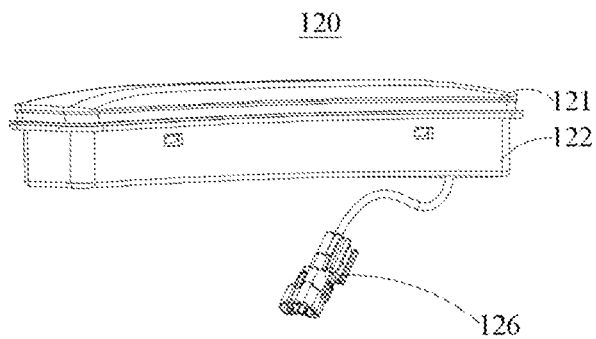
FIG. 30 is a schematic structural view of a light source assembly according to an embodiment of the disclosure.
Figure 31:
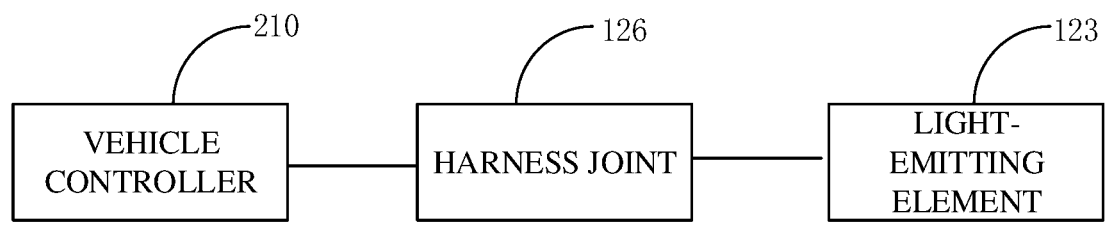
FIG. 31 is a schematic diagram illustrating a control connection between a light-emitting element and a vehicle according to an embodiment of the disclosure.

FIG. 30 is a schematic structural view of a light source assembly according to an embodiment of the disclosure. FIG. 31 is a schematic diagram illustrating a control connection between a light-emitting element and a vehicle according to an embodiment of the disclosure. In the embodiment, the light source assembly 120 further includes a harness joint 126. The harness joint 126 is in communication with the light-emitting element 123 and a vehicle controller 210. The harness joint 126 is configured to receive a control signal sent by the vehicle controller 210 and transmit the control signal to the light-emitting element 123 to control the light-emitting element 123 to emit light of a preset pattern.

In the embodiment, a bottom wall of the lampshade 121 defines a through hole, and a bottom wall of the box 122 defines a through hole. One end of the harness joint 126 is connected to the light-emitting element 123 received in the accommodating space 124, and the other end of the harness joint 126 is connected to the vehicle controller 210, so that the harness joint 126 can communicate the light-emitting element 123 with the vehicle controller 210. The light-emitting element 123 can receive a light control signal sent by the vehicle controller 210, so that the light-emitting element 123 can emit light of a preset pattern, which may be a monochromatic light or a polychromatic light with changing hues.

Figure 32:
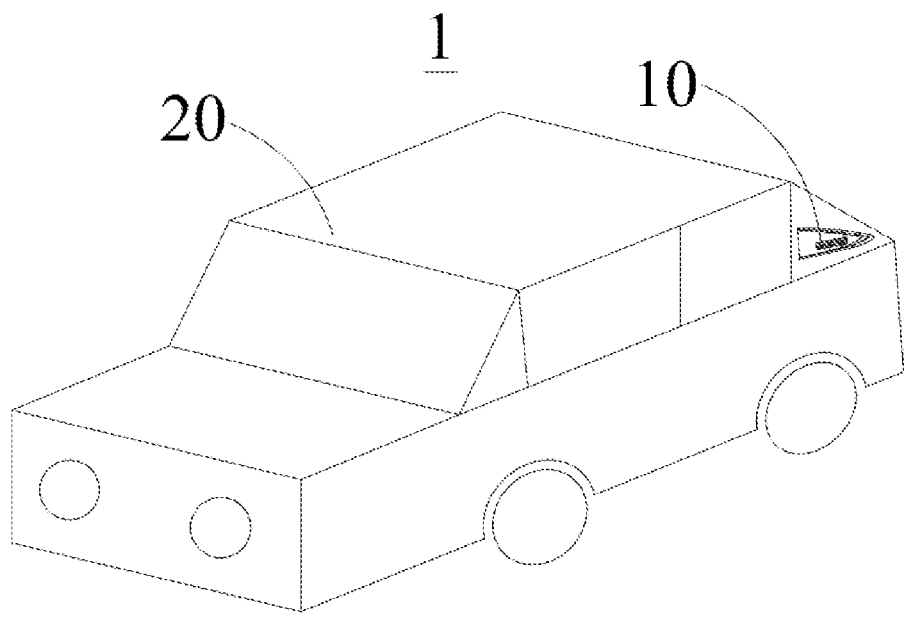
FIG. 32 is a schematic structural view of a vehicle according to an embodiment of the disclosure.
Figure 33:
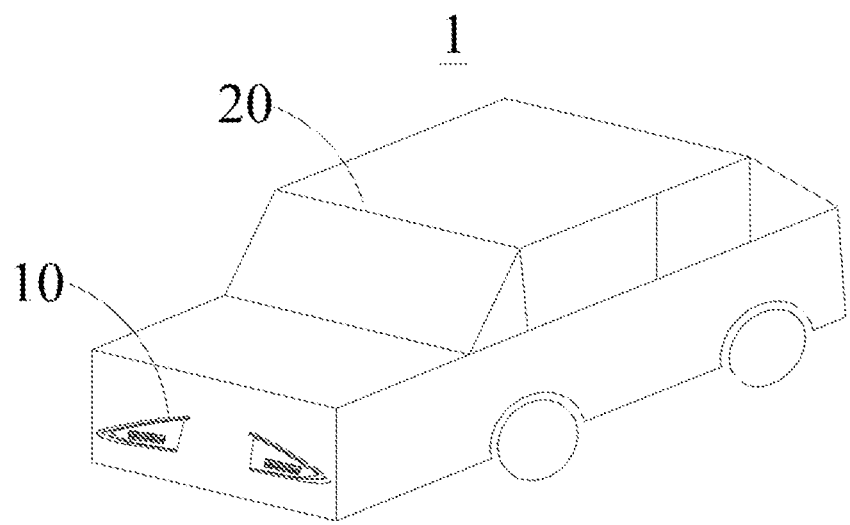
FIG. 33 is a schematic structural view of a vehicle according to another embodiment of the disclosure.

FIG. 32 is a schematic structural view of a vehicle according to an embodiment of the disclosure. FIG. 33 is a schematic structural view of a vehicle according to another embodiment of the disclosure. A vehicle 1 is further provided in the disclosure. The vehicle 1 includes the light-transmitting assembly 10 according to any one of the above embodiments. The vehicle further includes a vehicle body 20. The light-transmitting assembly 10 is fixed to the vehicle body 20.

In the embodiment, the vehicle 1 may be, but is not limited to, cars, multi-purpose automobiles (MPV), sports/suburban utility vehicles (SUV), off-road vehicles (ORV), pick-and-place vehicles, passenger cars, cargo cars, and the like.

In the embodiments, the light-transmitting assembly 10 may be attached to a side surface (see FIG. 32), a front (see FIG. 33), or a rear of the vehicle body 20. In FIG. 32, the light-transmitting assembly 10 is disposed on the side surface of the vehicle body 20, that is, the light-transmitting assembly 10 serves as a window assembly of the vehicle 1.

In FIG. 33, an example in which the light-transmitting assembly 10 is attached to the front of the vehicle body 20 is illustrated. The light-transmitting assembly 10 may be a low beam, a high beam, a turn light, and a fog light. In another embodiment, the light-transmitting assembly 10 is attached to the rear of the vehicle body 20. The light-transmitting assembly 10 may be a stop light and a turn lamp. In another embodiment, the light-transmitting assembly 10 is disposed on a side surface of the vehicle body 20 to serve as a turn light.

In the embodiment, the light-transmitting substrate 110 of the light-transmitting assembly 10 may be made of glass, high-light plastic, or silica gel. The light-transmitting substrate 110 may be made of any material having a good light-transmitting property.

In the embodiment, the lampshade 121 of the light-transmitting assembly 10 is made of a high-light material, and a unidirectional light-transmitting glass ink is sprayed on an inner surface of the lampshade 121 to shield electronic assemblies of the light-emitting element 123, thereby improving a lighting effect of the light-emitting element 123.

In the embodiment, the light-transmitting assembly is positioned at a visible portion on an outer side surface of the vehicle body 20 and has high-gloss surfaces, thereby enhancing the glossiness of the vehicle body 20.

It may be understood that the application of the disclosure is not limited to the above examples, and those skilled in the art can make improvements or modifications according to the above descriptions, and all these improvements and modifications shall belong to the scope of protection of the appended claims of the disclosure.

What is claimed is:
1. A light-transmitting assembly, comprising:
 a light-transmitting substrate defining a mounting through-hole; and
 a light source assembly connected to the light-transmitting substrate and positioned at the mounting through-hole, wherein the light source assembly comprises a lampshade, a box, and a light-emitting element, the lampshade is detachably connected to the box, the lampshade and the box cooperatively define an accommodating space, and the light-emitting element is received in the accommodating space;
 wherein the lampshade is fixedly connected to the light-transmitting substrate and formed at the mounting through-hole through injection molding; or the box is fixedly connected to the light-transmitting substrate and formed at the mounting through-hole through injection molding;

wherein the lampshade has a first fitting portion, the box has a second fitting portion, and the first fitting portion and the second fitting portion mate with each other to enable the lampshade to be detachably connected to the box.

2. The light-transmitting assembly of claim 1, wherein the first fitting portion is a groove and the second fitting portion is a hook, or the first fitting portion is a hook and the second fitting portion is a groove; and the box is snap-fitted with the lampshade through the groove and the hook.

3. The light-transmitting assembly of claim 1, wherein the light source assembly further comprises a sealing ring arranged between the lampshade and the box to enable the lampshade to be in sealed connection with the box.

4. The light-transmitting assembly of claim 1, wherein the lampshade comprises a lampshade body and a first limiting portion protruding from the lampshade body, the box comprises a box body and a second limiting portion protruding from the box body, the light-transmitting substrate is arranged between the first limiting portion and the second limiting portion, and the first fitting portion and the second fitting portion cooperate to detachably connect the box, the lampshade, and the light-transmitting substrate together.

5. The light-transmitting assembly of claim 4, wherein the light source assembly further comprises a sealing ring, wherein the lampshade, the box, and the light-transmitting substrate cooperatively define a gap therebetween, and the sealing ring extends into the gap to enable the lampshade, the box, and the light-transmitting substrate to be in sealed connection with one another.

6. The light-transmitting assembly of claim 5, wherein part of the box body extends into the mounting through-hole, the part of the box body and the light-transmitting substrate cooperatively define a first gap therebetween, and the sealing ring extends into the first gap and abuts against both the first limiting portion and the second limiting portion.

7. The light-transmitting assembly of claim 5, wherein the second limiting portion is positioned at one side of the light-transmitting substrate, and the second limiting portion and the light-transmitting substrate cooperatively define a second gap therebetween; the first limiting portion is positioned at another side of the light-transmitting substrate, part of the box body extends into the mounting through-hole, and the part of the box body and the first limiting portion cooperatively define a third gap therebetween; and the sealing ring further extends into at least one of the second gap or the third gap.

8. The light-transmitting assembly of claim 4, wherein the first fitting portion is farther away from the light-transmitting substrate than both the first limiting portion and the second limiting portion, and the second fitting portion is farther away from the light-transmitting substrate than both the first limiting portion and the second limiting portion.

9. The light-transmitting assembly of claim 4, wherein the first limiting portion is positioned at one side of the light-transmitting substrate, and all of the second limiting portion, the first fitting portion, and the second portion are positioned at the other side of the light-transmitting substrate.

10. The light-transmitting assembly of claim 1, wherein the mounting through-hole is implemented as one or more mounting through-holes, the light source assembly is implemented as one or more light source assemblies, a number of the one or more mounting through-holes is equal to a number of the one or more light source assemblies, and the one or more light source assemblies are in one-to-one correspondence with the one or more mounting through-holes, and each of the one or more light source assemblies faces a corresponding mounting through-hole.

11. The light-transmitting assembly of claim 1, wherein the light-transmitting substrate comprises at least two light-transmitting sub-substrates, the mounting through-hole is implemented into one or more mounting through-holes, and each of the one or more mounting through-holes is defined between two adjacent light-transmitting sub-substrates.

12. The light-transmitting assembly of claim 1, wherein the light source assembly further comprises:

a harness joint in communication with the light-emitting element and a vehicle controller, wherein the harness joint is configured to receive a control signal sent by the vehicle controller and transmit the control signal to the light-emitting element to control the light-emitting element to emit light of a preset pattern.

13. The light-transmitting assembly of claim 1, wherein the lampshade extends through the mounting through-hole, and the box extends through the mounting through-hole.

14. A vehicle, comprising a light-transmitting assembly and a vehicle body, the light-transmitting assembly being fixed to the vehicle body, and the light-transmitting assembly comprising a light-transmitting substrate and a light source assembly, wherein the light-transmitting substrate defines a mounting through-hole; and the light source assembly is connected to the light-transmitting substrate and positioned at the mounting through-hole, wherein the light source assembly comprises a lampshade, a box, and a light-emitting element, the lampshade is detachably connected to the box, the lampshade and the box cooperatively define an accommodating space, and the light-emitting element is received in the accommodating space;

wherein the lampshade is fixedly connected to the light-transmitting substrate and formed at the mounting through-hole through injection molding; or the box is fixedly connected to the light-transmitting substrate and formed at the mounting through-hole through injection molding wherein the lampshade has a first fitting portion, the box has a second fitting portion, and the first fitting portion and the second fitting portion mate with each other to enable the lampshade to be detachably connected to the box.

15. The vehicle of claim 14, wherein the first fitting portion is a groove and the second fitting portion is a hook, or the first fitting portion is a hook and the second fitting portion is a groove; and the box is snap-fitted with the lampshade through the groove and the hook.

16. The vehicle of claim 14, wherein the light source assembly further comprises a sealing ring arranged between the lampshade and the box to enable the lampshade to be in sealed connection with the box.

17. The vehicle of claim 14, wherein the lampshade comprises a lampshade body and a first limiting portion protruding from the lampshade body, the box comprises a box body and a second limiting portion protruding from the box body, the light-transmitting substrate is arranged between the first limiting portion and the second limiting portion, and the first fitting portion and the second fitting portion cooperate to detachably connect the box, the lampshade, and the light-transmitting substrate together.

18. The vehicle of claim 17, wherein the light source assembly further comprises a sealing ring, wherein the lampshade, the box, and the light-transmitting substrate cooperatively define a gap therebetween, and the sealing ring extends into the gap to enable the lampshade, the box, and the light-transmitting substrate to be in sealed connection with one another.

\* \* \* \* \*